(12) United States Patent
Peterson et al.

(10) Patent No.: US 8,918,520 B2
(45) Date of Patent: *Dec. 23, 2014

(54) METHODS AND SYSTEMS FOR ELECTRONIC DATA EXCHANGE UTILIZING CENTRALIZED MANAGEMENT TECHNOLOGY

(75) Inventors: Jonathan M. Peterson, Atlanta, GA (US); Magnus H. Stark, Atlanta, GA (US); Jacqueline E. Kozee, Lawrenceville, GA (US); M. Cort Atkinson, Atlanta, GA (US); Donna Kay Hodges, Cumming, GA (US); Bridget N. Bonner, Tucker, GA (US); Mario Muth, Norcross, GA (US)

(73) Assignee: AT&T Intellectual Property I, L.P., Atlanta, GA (US)

(\*) Notice: Subject to any disclaimer, the term of this patent is extended or adjusted under 35 U.S.C. 154(b) by 0 days.

This patent is subject to a terminal disclaimer.

(21) Appl. No.: 13/479,849

(22) Filed: May 24, 2012
(Under 37 CFR 1.47)

(65) Prior Publication Data

US 2012/0233206 A1 Sep. 13, 2012

Related U.S. Application Data

(63) Continuation of application No. 10/293,247, filed on Nov. 12, 2002, now Pat. No. 8,214,501, which is a continuation of application No. 10/087,733, filed on Mar. 4, 2002, now abandoned.

(60) Provisional application No. 60/273,088, filed on Mar. 2, 2001.

(51) Int. Cl.
*G06F 15/16* (2006.01)
*G06F 9/54* (2006.01)

(52) U.S. Cl.
CPC .................................. *G06F 9/541* (2013.01)
USPC ........... 709/227; 709/203; 709/217; 709/224; 709/219

(58) Field of Classification Search
USPC ........................ 709/219, 227, 203, 217, 224
See application file for complete search history.

(56) References Cited

U.S. PATENT DOCUMENTS

| 5,369,570 A | 11/1994 | Parad |
| 5,521,814 A | 5/1996 | Teran et al. |
| 5,548,506 A | 8/1996 | Srinivasan |
| 5,557,780 A | 9/1996 | Edwards et al. |
| 5,572,430 A | 11/1996 | Akasaka et al. |

(Continued)

OTHER PUBLICATIONS

"Fireclick's New Blueflame 2.0 Scorches a Path to E-Business Profitability," Jan. 19, 2001, printed from http://www.fireclick.com/newsroom/releases/01292001b.html.

(Continued)

*Primary Examiner* — Lan-Dai T Truong
(74) *Attorney, Agent, or Firm* — Hartman & Citrin LLC

(57) ABSTRACT

Methods and systems are provided for exchanging information between companies in a partnership. One method embodiment includes operatively associating a first company with a transaction directory through a directory management portal. The transaction directory is configured to permit establishment of at least one connection to a translation engine for permitting at least one transaction to occur through the connection. The method also includes connecting at least a second company to the translation engine to permit the transaction to occur between at least the first and second companies. The transaction includes an exchange of information between at least the first and second companies.

20 Claims, 16 Drawing Sheets

(56) References Cited

U.S. PATENT DOCUMENTS

| | | | |
|---|---|---|---|
| 5,664,115 A | 9/1997 | Fraser | |
| 5,727,129 A | 3/1998 | Barrett et al. | |
| 5,740,430 A | 4/1998 | Rosenberg et al. | |
| 5,754,939 A | 5/1998 | Herz et al. | |
| 5,774,866 A | 6/1998 | Horwitz et al. | |
| 5,799,293 A | 8/1998 | Kaepp | |
| 5,826,236 A | 10/1998 | Narimatsu et al. | |
| 5,878,223 A | 3/1999 | Becker et al. | |
| 5,881,231 A | 3/1999 | Takagi et al. | |
| 5,889,993 A | 3/1999 | Kroeger et al. | |
| 5,907,848 A | 5/1999 | Zaiken et al. | |
| 5,940,082 A | 8/1999 | Brinegar et al. | |
| 5,983,194 A | 11/1999 | Hogge et al. | |
| 6,055,569 A | 4/2000 | O'Brien et al. | |
| 6,085,193 A | 7/2000 | Malkin et al. | |
| 6,098,064 A | 8/2000 | Pirolli et al. | |
| 6,115,642 A | 9/2000 | Brown et al. | |
| 6,128,701 A | 10/2000 | Malcolm et al. | |
| 6,138,104 A | 10/2000 | Marchak et al. | |
| 6,157,915 A | 12/2000 | Bhaskaran et al. | |
| 6,182,122 B1 | 1/2001 | Berstis | |
| 6,182,133 B1 | 1/2001 | Horvitz | |
| 6,230,066 B1 | 5/2001 | Sferro et al. | |
| 6,233,493 B1 | 5/2001 | Cherneff et al. | |
| 6,243,092 B1 | 6/2001 | Okita et al. | |
| 6,249,769 B1 | 6/2001 | Ruffin et al. | |
| 6,295,513 B1 | 9/2001 | Thackston | |
| 6,298,319 B1 | 10/2001 | Heile et al. | |
| 6,304,861 B1 | 10/2001 | Ferguson | |
| 6,310,941 B1 | 10/2001 | Crutcher et al. | |
| 6,330,586 B1 | 12/2001 | Yates et al. | |
| 6,338,088 B1 | 1/2002 | Waters et al. | |
| 6,385,641 B1 | 5/2002 | Jiang et al. | |
| 6,415,368 B1 | 7/2002 | Glance et al. | |
| 6,460,082 B1 | 10/2002 | Lumelsky et al. | |
| 6,470,357 B1 | 10/2002 | Garcia et al. | |
| 6,493,702 B1 | 12/2002 | Adar et al. | |
| 6,571,140 B1 | 5/2003 | Wewalaarachchi et al. | |
| 6,584,498 B2 | 6/2003 | Nguyen | |
| 6,591,288 B1 | 7/2003 | Edwards et al. | |
| 6,615,250 B1 | 9/2003 | Brunet et al. | |
| 6,681,243 B1 | 1/2004 | Putzolu et al. | |
| 6,701,342 B1 | 3/2004 | Bartz et al. | |
| 6,738,470 B1 | 5/2004 | Aronovitz | |
| 6,748,447 B1 | 6/2004 | Basani et al. | |
| 6,772,229 B1 | 8/2004 | Achacoso et al. | |
| 6,823,382 B2 | 11/2004 | Stone | |
| 6,839,733 B1 | 1/2005 | Lange et al. | |
| 6,959,268 B1 | 10/2005 | Myers, Jr. et al. | |
| 7,024,497 B1 | 4/2006 | Maffezoni | |
| 7,032,016 B2 | 4/2006 | Cerami et al. | |
| 7,039,037 B2 | 5/2006 | Wang et al. | |
| 7,130,807 B1 | 10/2006 | Mikurak | |
| RE39,717 E | 7/2007 | Yates et al. | |
| 7,278,156 B2 | 10/2007 | Mei et al. | |
| 7,310,672 B2 | 12/2007 | Rolia | |
| 7,343,348 B2 | 3/2008 | McAvoy et al. | |
| 7,376,600 B1 | 5/2008 | Wadawadigi et al. | |
| 7,426,551 B1 | 9/2008 | Benzinger et al. | |
| 7,467,192 B1 | 12/2008 | Lemler et al. | |
| 7,730,172 B1 | 6/2010 | Lewis | |
| 2001/0016492 A1 | 8/2001 | Igarashi et al. | |
| 2002/0023119 A1 | 2/2002 | Gray et al. | |
| 2002/0029260 A1 | 3/2002 | Dobbins et al. | |
| 2002/0035483 A1 | 3/2002 | Patel | |
| 2002/0040304 A1 | 4/2002 | Shenoy et al. | |
| 2002/0059054 A1 | 5/2002 | Bade et al. | |
| 2002/0059148 A1 | 5/2002 | Rosenhaft et al. | |
| 2002/0061741 A1 | 5/2002 | Leung et al. | |
| 2002/0073236 A1 | 6/2002 | Helgeson et al. | |
| 2002/0087487 A1 | 7/2002 | Hassinger | |
| 2002/0099598 A1 | 7/2002 | Eicher et al. | |
| 2002/0111922 A1 | 8/2002 | Young et al. | |
| 2002/0116620 A1 | 8/2002 | Gimbert et al. | |
| 2002/0128946 A1 | 9/2002 | Chehade et al. | |
| 2003/0050960 A1 | 3/2003 | Kawamura et al. | |
| 2003/0055652 A1 | 3/2003 | Nichols et al. | |
| 2003/0061256 A1 | 3/2003 | Mathews et al. | |
| 2003/0115311 A1 | 6/2003 | Johnston-Watt et al. | |
| 2003/0135609 A1 | 7/2003 | Carlson et al. | |
| 2003/0158785 A1 | 8/2003 | Erca | |
| 2003/0167180 A1 | 9/2003 | Chung et al. | |
| 2003/0229522 A1 | 12/2003 | Thompson et al. | |
| 2003/0236745 A1 | 12/2003 | Hartsell et al. | |
| 2004/0034607 A1 | 2/2004 | Piccinelli | |
| 2005/0187866 A1 | 8/2005 | Lee | |
| 2006/0095375 A1 | 5/2006 | Doyle et al. | |
| 2008/0040245 A1 | 2/2008 | Wadawadigi et al. | |

OTHER PUBLICATIONS

U.S. Appl. No. 10/649,511, filed Aug. 26, 2003.
U.S. Appl. No. 10/649,510, filed Aug. 26, 2003.
U.S. Appl. No. 10/446,569, filed May 28, 2003.
U.S. Appl. No. 60/384,043, filed May 28, 2002.
U.S. Appl. No. 60/273,088, filed Mar. 2, 2001.
U.S. Appl. No. 10/087,733, filed Mar. 4, 2002.
U.S. Appl. No. 09/886,071, filed Jun. 20, 2001.
U.S. Office Action dated Jun. 26, 2006 in U.S. Appl. No. 10/293,247.
U.S. Office Action dated Jan. 12, 2007 in U.S. Appl. No. 10/293,247.
U.S. Office Action dated Oct. 16, 2007 in U.S. Appl. No. 10/293,247.
U.S. Office Action dated Jul. 23, 2008 in U.S. Appl. No. 10/293,247.
U.S. Office Action dated Dec. 23, 2008 in U.S. Appl. No. 10/293,247.
U.S. Office Action dated Jul. 6, 2009 in U.S. Appl. No. 10/293,247.
U.S. Office Action dated Jan. 21, 2010 in U.S. Appl. No. 10/293,247.
U.S. Office Action dated Jun. 3, 2010 in U.S. Appl. No. 10/293,247.
U.S. Office Action dated Jul. 8, 2011 in U.S. Appl. No. 10/293,247.
U.S. Office Action dated Dec. 22, 2011 in U.S. Appl. No. 10/293,247.
U.S. Notice of Allowance dated Mar. 5, 2012 in U.S. Appl. No. 10/293,247.
U.S. Office Action dated Jul. 3, 2007 in U.S. Appl. No. 10/446,569.
U.S. Office Action dated Dec. 28, 2007 in U.S. Appl. No. 10/446,569.
U.S. Office Action dated Jun. 11, 2008 in U.S. Appl. No. 10/446,569.
U.S. Office Action dated Dec. 11, 2008 in U.S. Appl. No. 10/446,569.
U.S. Office Action dated Apr. 1, 2009 in U.S. Appl. No. 10/446,569.
U.S. Office Action dated Oct. 26, 2009 in U.S. Appl. No. 10/446,569.
U.S. Notice of Allowance dated Jun. 16, 2010 in U.S. Appl. No. 10/446,569.
U.S. Notice of Allowance dated Aug. 5, 2010 in U.S. Appl. No. 10/446,569.
U.S. Office Action dated Sep. 13, 2004 in U.S. Appl. No. 09/886,071.
U.S. Office Action dated Mar. 7, 2005 in U.S. Appl. No. 09/886,071.
U.S. Office Action dated Jul. 5, 2005 in U.S. Appl. No. 09/886,071.
U.S. Office Action dated Dec. 12, 2005 in U.S. Appl. No. 09/886,071.
Advisory Action dated Mar. 3, 2006 in U.S. Appl. No. 09/886,071.
U.S. Office Action dated Jul. 18, 2006 in U.S. Appl. No. 09/886,071.
U.S. Office Action dated May 18, 2007 in U.S. Appl. No. 09/886,071.
U.S. Office Action dated Jan. 2, 2008 in U.S. Appl. No. 09/886,071.
U.S. Office Action dated Jul. 14, 2008 in U.S. Appl. No. 09/886,071.
U.S. Office Action dated Jan. 12, 2009 in U.S. Appl. No. 09/886,071.
U.S. Office Action dated Jun. 25, 2009 in U.S. Appl. No. 09/886,071.
U.S. Office Action dated Oct. 26, 2009 in U.S. Appl. No. 09/886,071.
U.S. Notice of Allowance dated Mar. 5, 2010 in U.S. Appl. No. 09/886,071.
U.S. Office Action dated Apr. 9, 2007 in U.S. Appl. No. 10/649,510.
U.S. Office Action dated Sep. 24, 2007 in U.S. Appl. No. 10/649,510.
U.S. Office Action dated Apr. 10, 2007 in U.S. Appl. No. 10/649,511.
U.S. Office Action dated Sep. 24, 2007 in U.S. Appl. No. 10/649,511.
Duchamp, Dan, "Prefetching Hyperlinks", Proceedings of USITS' 99: The $2^{nd}$ USENIX Symposium on Internet Technologies & Systems, Oct. 11-14, 1999, Boulder, Colorado, USA.
U.S. Appl. No. 10/649,510 Office Action dated Mar. 20, 2008.
U.S. Appl. No. 10/649,510 Office Action dated Oct. 17, 2008.
U.S. Appl. No. 10/649,510 Notice of Allowance dated Feb. 9, 2009.
U.S. Appl. No. 10/649,510 Office Action dated Apr. 28, 2009.
U.S. Appl. No. 10/649,510 Office Action dated Feb. 24, 2010.
U.S. Appl. No. 10/649,511 Office Action dated Mar. 20, 2008.
U.S. Appl. No. 10/649,511 Office Action dated Oct. 29, 2008.
U.S. Appl. No. 10/649,511 Office Action dated May 28, 2009.
U.S. Appl. No. 10/649,511 Office Action dated Dec. 8, 2009.

| CONDOR sub-component | Industry Term |
|---|---|
| Directory Management Portal | Centralized Management, Trading Partner Locator, Private Registered, Processes, Public Registered Processes, Real Time Analysis |
| Transaction Directory | Private Registered Processes, Public Registered Processes, Inter-Enterprise Data/System Connectors, Adaptors |
| Translation Engine | Transformers, Registered Processes, Transaction Manager, Transaction Processor, Process Engine |

| HALO sub-component | Industry Term |
|---|---|
| Virtual Prototyping | Workflow, Groupware, Virtual Prototyping and Simulation, Knowledge Management |
| Adaptive Planning | Workflow, Business Process Automator, Real Time Analysis |
| Partner Research / Repositories / Directories | Trading Partner Locator, Business Partner and TPA Directory, Public Registered Processes, Private Registered Processes, Trading Partner Profiles, Knowledge Management, Catalog, Search |

FIG. 6

| Component | Potential Toolset | Issues |
|---|---|---|
| Directory Management Portal | • Vitria<br>• Netfish<br>• BEA<br>• IBM | SLA<br>• How to guarantee a certain level of service once data leaves a provider's network?<br>• How credits are issued to customers when a standard has not been met?<br>• Is the onus on the customer to notify the provider of a problem?<br>• Need is for tools that can track XML transaction content and alert support staff to potential failure conditions in the information.<br>• Unambiguously clarification of "spans of control".<br>Security<br>• Security can be troubling when "Virtual Hub" extended to external partners: authentication/authorization, confidentiality/privacy, data integrity, encryption = no transcoding, VPN |
| Single Point of Integration Management | • Manugistics<br>• WebMethods<br>• SDRC<br>• Viewlocity<br>• WebPLAN<br>• SeeBeyond<br>• TIBCO<br>• Mercator<br>• Saga | • For B2B customers, company information viewed as even more sensitive, meaning that security must be a number one priority.<br>• How to operate in the virtual environment and protect value-added intellectual process<br>Transaction Management and Rollback across virtual enterprises<br>• Need is for tools that can track XML transaction content and alert support staff to potential failure conditions in the information.<br>Scale/Security/Manageability<br>• Instance/partner or shared instance strategy – some tools lend themselves to one or the other; therefore, dictating policy and architecture.<br>• Centralized hub/spoke architecture vs. distributed architecture. Single enterprise choice might lean towards centralized hub/spoke, but in a BSP model – not sure. Need to see how security, manageability, scalability stack up in importance in these 2 different environments |

FIG. 9

| Component | Potential Toolset | Issues |
|---|---|---|
| Transaction Directory | | |
| Connectors | • Vitria<br>• IBM<br>• Extricity<br>• BEA<br>• Netfish<br>• Mangistics<br>• WebMethods<br>• SDRC<br>• Viewlocity<br>• WebLAN<br>• SeeBeyond<br>• TIBCO<br>• Mercator<br>• CA<br>• Saga | Connectors/Adaptors maintenance<br>• Volume of modifications to formats and protocols could grow geometrically. No current EAI/IEI solution offers a robust mechanism to manage this change in volume.<br>• Must have mechanism of identifying semantic discrepancies, so they can be associated with different processes, transformations, and other actions within the system.<br>Trust Issues<br>• Internet markets require supply chain partners to post sensitive information such as price lists, product design specifications, and other valuable intellectual property. Concerned that such information could fall into the hands of a competitor, either accidentally or intentionally, many participating companies are seeking greater assurances relative to confidentiality.<br>• Because many B2B portals act as brokers, bringing buyers and sellers together, many client companies are demanding proof of fair and equal treatment, such as engaging a third-party auditor to certify marketplace vendor's impartiality.<br>Evolving standards<br>• SOAP, WSML, RM/IIOP,...<br>Transaction Management and Rollback across virtual enterprises<br>• Global Transactions and Rollback Issues<br>• Need is for tools that can track XML transaction content and alert support staff to potential failure conditions in the information.<br>Scale/Security/Manageability<br>• Instance/partner or shared instance strategy — some tools lend themselves to one or the other; therefore, dictating policy and architecture.<br>• IEI/EAI solutions must have mechanisms that enable process state to be maintained in a persistent fashion to handle the oft long-running transactions.<br>• Maintaining large number of long-running persistent processes requires some re-engineering and new-monitoring mechanisms.<br>• Centralized hub/spoke architecture vs. distributed architecture. Single enterprise choice might lean towards centralized hub/spoke, but in a BSP model – not sure. Need to prototype to see how security, manageability, scalability stack up in importance in these 2 different environments |

FIG. 10

| Component | Potential Toolset | Issues |
|---|---|---|
| Translation Engine | • Vitria<br>• Nefish<br>• BEA<br>• IBM<br>• SeeBeyond<br>• Mangistics<br>• WebMethods<br>• SDRC<br>• WebPLAN<br>• TIBCO<br>• Mercator<br>• CA<br>• Saga<br>• Viewlocity | Data format<br>• E-business enabling capabilities that are usually lacking in EAI solutions are primarily linked to the challenge of maintaining metadata about the business process relationship with other party (UDDI, BizCodes, TPA, TPAML,... - should help)<br>Data/XML transformer maintenance<br>• Volume of modifications to formats and dialects could grow geometrically. No current EAI/EI solution offers a robust mechanism to manage this change in volume.<br>• Should have mechanism of identifying semantic discrepancies, so they can be associated with different processes, transformations, and other actions within the system.<br>Trust Issues<br>• Limited trust in trading partner relationships<br>• Internet markets require supply chain partners to post sensitive information such as price lists, product design specifications, and other valuable intellectual property. Concerned that such information could fall into the hands of a competitor, either accidentally or intentionally, many participating companies are seeking greater assurances relative to confidentiality.<br>• Because many B2B portals act as brokers, bringing buyers and sellers together, many client companies are demanding proof of fair and equal treatment, such as engaging a third-party auditor to certify marketplace vendor's impartiality.<br>Evolving standards<br>• Multiple competing standards (ebXML, CXML, eCO, BizTalk, QBL...) – BizCodes and other efforts may help<br>• Rudimentary tools<br>• Only XML's syntax has been standardized, tags are not. In implementing XML, need standardization of tags between organizations or departments to describe values and attributes.<br>• Anomalies: DOM should ideally provide full support. In reality, DOM implementation anomalies exist. IBM and SUN parsers, for instance may deal differently with some common XML document elements. --XML is not quite a universal translator.<br>Standards Bodies Membership<br>• BLS needs to join e-Commerce Organization bodies; logical investment for companies that depend on electronic commerce or supply chains to remain competitive |
| Inter-Enterprise Integration toolset | | |
| Transformers | | |

FIG. 11

| Component | Potential Toolset | Issues |
|---|---|---|
| Adaptive Planning | • Vitria<br>• IBM<br>• Netfish<br>• BEA<br>• Ilog<br>• SDRC<br>• Viewlocity<br>• Mamagistics<br>• WebPLAN<br>• CA<br>• Mercator<br>• Saga<br>• Sierra Optima<br>• Vie<br>• Synquest<br>• Syncra<br>• e-Vis<br>• Vigilance<br>• e-Connection<br>• EAI | Start-up Issues<br>• Enough product information<br>• Ability to create master catalogs<br>Data format<br>• Challenge of maintaining metadata about the business process, product, catalogs, etc.,…<br>Trust Issues<br>• Limited trust in trading partner relationships<br>• Internet markets require supply chain partners to post sensitive information such as price lists, product design specifications, and other valuable intellectual property. Concerned that such information could fall into the hands of a competitor, either accidentally or intentionally, many participating companies are seeking greater assurances relative to confidentiality.<br>• Because many B2B portals act as brokers, bringing buyers and sellers together, many client companies are demanding proof of fair and equal treatment, such as engaging a third-party auditor to certify marketplace vendor's impartiality.<br>Security Technology Issues<br>• Security – ACLS, roles, responsibilities,…<br>Integrated catalog interoperability issues (immature, but emerging standards)<br>Security (private vs. public)<br>It health monitoring vs. proactively reacting to business conditions in a corrective programmatic manner.<br>At the broad/shallow level the ability to maintain usefulness/compositeness to very technical industries with deep vertical markets (e.g., not sure that generic broad/shallow helps the "process" industries – but may still be beneficial to the mid-market. |
| Ability to capture/ save/ query/ index all critical data | | |
| Simulate difference scenarios and view their impact | | |
| Pre-development | | |
| Design Process | | |
| Workflow process | | |
| Production process | | |
| Post-development process | | |

FIG. 12

| Component | Potential Toolset | Issues |
|---|---|---|
| Virtual Prototyping | • WebScope<br>• SDRC<br>• Xbrioso<br>• Spatial Corp ACIS<br>• EAI | Start-up Issues<br>• Enough product information<br>• Ability to create master catalogs<br>Data format<br>• Challenge of maintaining metadata about the business process, product, catalog, etc.,...<br>Trust Issues<br>• Limited trust in trading partner relationships<br>• Internet markets require supply chain partners to post sensitive information such as price lists, product design specifications, and other valuable intellectual property. Concerned that such information could fall into the hands of a competitor, either accidentally or intentionally, many participating companies are seeking greater assurances relative to confidentiality.<br>• Because many B2B portals act as brokers, bringing buyers and sellers together, many client companies are demanding proof of fair and equal treatment, such as engaging a third-party auditor to certify marketplace vendor's impartiality.<br>Security Technology Issues<br>Intellectual Property rights<br>Integrated catalog interoperability issues (immature, but emerging standards)<br>Usefulness in highly technical process industries<br>• Integration with/between systems at the broad/shallow level coupled with maintaining usefulness/competitiveness for those highly technical industries such as Chemical Process Industries.<br>Security – ACLS, roles, responsibilities,.... |
| Real time collaboration | | |
| Security | | |
| Generic | | |
| Platform independent | | |

FIG. 13

| Component | Potential Toolset | Issues |
|---|---|---|
| Repositories/ Directories/Partner Research<br><br>Ability to build and query a "repository" of companies based on:<br>* Type of business<br>* Business practices | * Vitria<br>* BEA<br>* Extricity<br>* CA<br>* Saga<br>* Mercator<br>* IBM<br>* Netfish<br>* SDRC<br>* Viewlocity<br>* Manugistics<br>* WebPLAN<br>* WebMethods<br>* EAI<br>* Syncra<br>* e-Connections | Start-up Issues<br>* Enough product information<br>* Ability to create master catalogs<br>Data format<br>* Challenge of maintaining metadata about the business process, product, catalog, etc.,...<br>Trust Issues<br>* Limited trust in trading partner relationships<br>* Internet markets require supply chain partners to post sensitive information such as price lists, product design specifications, and other valuable intellectual property. Concerned that such information could fall into the hands of a competitor, either accidentally or intentionally, many participating companies are seeking greater assurances relative to confidentiality.<br>* Because many B2B portals act as brokers, bringing buyers and sellers together, many client companies are demanding proof of fair and equal treatment, such as engaging a third-party auditor to certify marketplace vendor's impartiality.<br>Security Technology Issues<br>Security (private vs. public)<br>* Security – ACLS, roles, responsibilities<br>Integrated catalog interoperability issues (immature, but emerging standards)<br>Standards immaturity. |

FIG. 14

| Possible Tool Sets | Comments |
|---|---|
| Vitria Business Ware + Vitria Business Network + IBM MQ Series + Vite + WebPlan + EAI or SDRC | • Distributed<br>• Vitria VBN is early UDDI implementation |
| App Server + IBM MQSeries Messaging, Integrator, Workflow + Extricity + Vite + WebPlan + EAI or SDRC | • Hub/Spoke<br>• Many off-the shelf connectors and transformers |
| Netfish + Vite + WebPlan + EAI or SDRC | • Good Security<br>• eBusiness Process editor for RosettaNet |
| App Server + Manugistics + Extricity + Vite + EAI or SDRC | • Good number of off-the-shelf transformers<br>• Hub/Spoke |
| WebMethods + MQSeries + WebPLAN + Vite + EAI or SDRC | • Well established<br>• Great set of "off-the shelf" transformers |

Notes:
1. EAI provides Internet-enabled visualization, collaboration and analysis tools
2. SDRC provides a web based collaborative environment for product development
3. Vite provides the "project design component" in the adaptive planning tool set.
4. WebPlan integrates supply chain management, product lifecycle management, customer relationship management and strategic and enterprise planning, with tactical execution systems and processes over the Internet

FIG. 15

METHODS AND SYSTEMS FOR ELECTRONIC DATA EXCHANGE UTILIZING CENTRALIZED MANAGEMENT TECHNOLOGY

CROSS REFERENCE TO RELATED APPLICATION

This application is a continuation of U.S. patent application Ser. No. 10/293,247, now U.S. Pat. No. 8,214,501, entitled "Methods and Systems for Electronic Data Exchange Utilizing Centralized Management Technology" filed Nov. 12, 2002, which is a continuation of U.S. patent application Ser. No. 10/087,733, now abandoned, entitled "Methods and Systems for Electronic Data Exchange Utilizing Centralized Management Technology" filed Mar. 4, 2002, which claims priority under 35 U.S.C. §119(e) to U.S. Provisional Patent Application No. 60/273,088 filed Mar. 2, 2001, each of which is incorporated herein by reference in its entirety.

BACKGROUND

To compete more effectively in the marketplace, an increasing number of commercial entities have decided to engage in strategic business alliances or partnerships. Strategic alliances permit companies to accelerate revenue growth and market expansion by providing access to investment capital, technology, markets, resources and different skill sets. The benefits offered by an alliance or partnership arrangement can enhance the ability of a company to produce and deliver products and services in a competitive marketplace. Competition is particularly an issue for relatively smaller companies that may not have the financial resources, information technology, and market access of larger commercial enterprises.

A strategic alliance usually requires the companies involved to share a variety of information. One solution for information exchange is installation of a frame relay to connect companies and establish a medium for data transactions. The static nature of frame relay technology, however, limits flexibility of the business decisions that can be made by the companies. As more connection options have become available, businesses have been able to choose a connectivity mix based on two primary business drivers: the company's pricing model and its partnering strategies. Connectivity options such as the Internet and other networking arrangements including, for example, secure hosting and IP-based VPN, have become available to entities seeking to leverage strategic business alliances. In addition, many companies have migrated to high-speed dynamic solutions. The use of dynamic extranets, for example, is expected to continue to grow in association with facilitation of information exchange between and among companies in strategic alliances.

It can be appreciated that companies that participate in strategic alliances must address a number of challenges. Once connected, a company in the alliance must identify and allocate resources to create point-to-point application integration with one or more of their alliance partners. Furthermore, business leaders often pursue connectivity decisions that lock the company into a long-term partnership or force the company into a bidding marketplace: there is often no middle ground between these extremes.

Companies that choose to grow through strategic partnerships may be forced to compromise information technology and systems security. Every connection that a company creates typically requires providing access through one or more firewalls of its computer systems. The purpose of a firewall is to limit external access to the computer systems and proprietary information of a company. This purpose can be frustrated, though, by the efforts of the company to improve connectivity and promote data exchange with its strategic partners.

In addition, establishing industry or cross-industry standards can be difficult or impossible, because conventional computing models are usually developed as single-company solutions and technology is rapidly changing. As a result, financial resources must be expended to conduct application integration projects with partners. Effective connectivity may require, for example, a common software application installed by all partners in an alliance to permit data exchange and collaboration. Therefore, some partners may be forced into using an undesirable software application, and new partners who may be added to the alliance may be forced to install and use the same software application to permit information exchange within the alliance.

To maintain competitiveness in the marketplace, companies must expend resources to perform research and development and/or to acquire new technology for producing and providing products and services. The ability of a company to increase the pace of its product development cycle and decrease the time to market for new products and services has a direct impact on the commercial success of the company. To focus on core competencies and conserve time, companies need to pursue collaborative efforts to expand their technical and operational resources pursuant to new product development. These collaborative efforts often involve cross-enterprise collaboration that requires effective information exchange.

Many companies experience delays in new product development due to a number of factors including, for example, isolated upfront planning, execution of project tasks in a linear, non-parallel fashion, misalignment of expectations between partners, poor or ineffective means of communication, and incompatible corporate cultures. An overarching problem is that the middle market cannot usually afford the sorts of tools that are necessary to allow collaboration between companies. Conventional ways of exchanging information in a collaborative effort between companies include electronic mail, exchange of electronic documents, video conferencing, telephone communication, and the like. These conventional ways of exchanging information are often ineffective at maximizing collaborative efforts.

What are needed, therefore, are improved methods and systems for centralized management of electronic data exchange between and among partners involved in a strategic alliance or partnership.

SUMMARY

In one embodiment of the present methods and systems, a method is provided for exchanging information between companies in a partnership. The method includes operatively associating a first company with a transaction directory through a directory management portal. The transaction directory is configured to permit establishment of at least one connection to a translation engine for permitting at least one transaction to occur through the connection. The method also includes connecting at least a second company to the translation engine to permit the transaction to occur between at least the first and second companies. The transaction includes an exchange of information between at least the first and second companies. In certain aspects of the present methods, the directory management portal and/or the transaction directory are managed by a centralized manager. In other aspects of the present methods, the translation engine operates externally with respect to at least one software application employed by the companies. Computer-readable media embodiments of the present methods are also provided.

In another embodiment of the present methods and systems, a system is provided for exchanging information between companies in a partnership. The system includes a directory management portal operatively associate with a first company and a transaction directory configured to be accessible by the company through the directory management portal. The transaction directory is configurable to establish at least one connection for the company. The system also includes a translation engine operatively associated with the transaction directory to permit at least one transaction to occur through the connection. The transaction includes information exchangeable between the first company and at least a second company.

BRIEF DESCRIPTION OF THE DRAWINGS

FIG. 6 is a table of terminology applied to certain embodiments of the present methods and systems;

FIG. 9 is a table illustrating various embodiments of potential tools that can be applied to certain embodiments of the present methods and systems;

FIG. 10 is a table illustrating various embodiments of potential tools that can be applied to certain embodiments of the present methods and systems;

FIG. 11 is a table illustrating various embodiments of potential tools that can be applied to certain embodiments of the present methods and systems;

FIG. 12 is a table illustrating various embodiments of potential tools that can be applied to certain embodiments of the present methods and systems;

FIG. 13 is a table illustrating various embodiments of potential tools that can be applied to certain embodiments of the present methods and systems;

FIG. 14 is a table illustrating various embodiments of potential tools that can be applied to certain embodiments of the present methods and systems; and, FIG. 15 is a table illustrating various embodiments of potential tools that can be applied to certain embodiments of the present methods and systems.

DETAILED DESCRIPTION

As sometimes used herein, the term "CONDOR" generally refers to methods and systems for electronic data exchange that are associated with methods and systems for managing data transactions between and among commercial entities such as, for example, companies or organizations involved in a strategic partnership or alliance.

As sometimes used herein, the term "HALO" generally refers to methods and systems for electronic data exchange that are associated with centralization of functions including, for example, product/service design and prototyping, product planning, partnering activities for research and development, and the like.

Figure 1A:
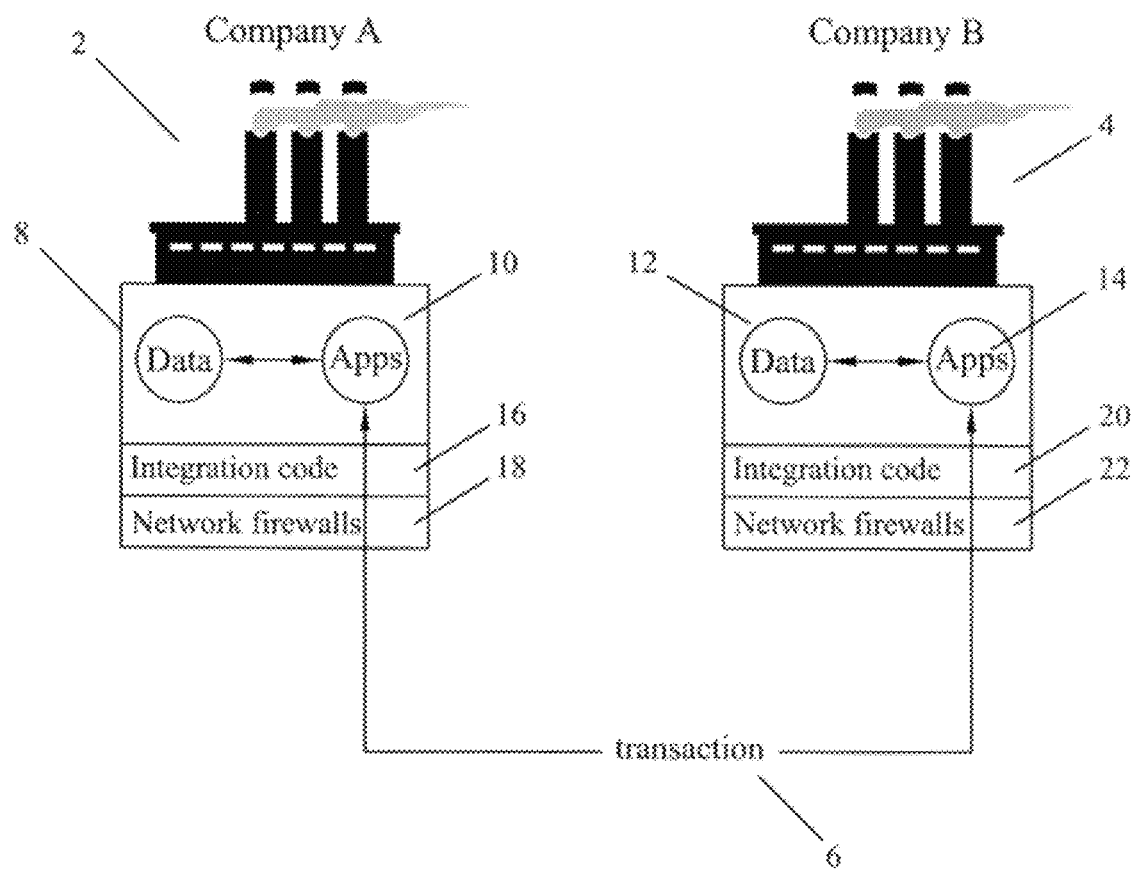
FIG. 1A is a schematic diagram of a conventional embodiment of a system for providing information exchange between partner entities.
Figure 1B:
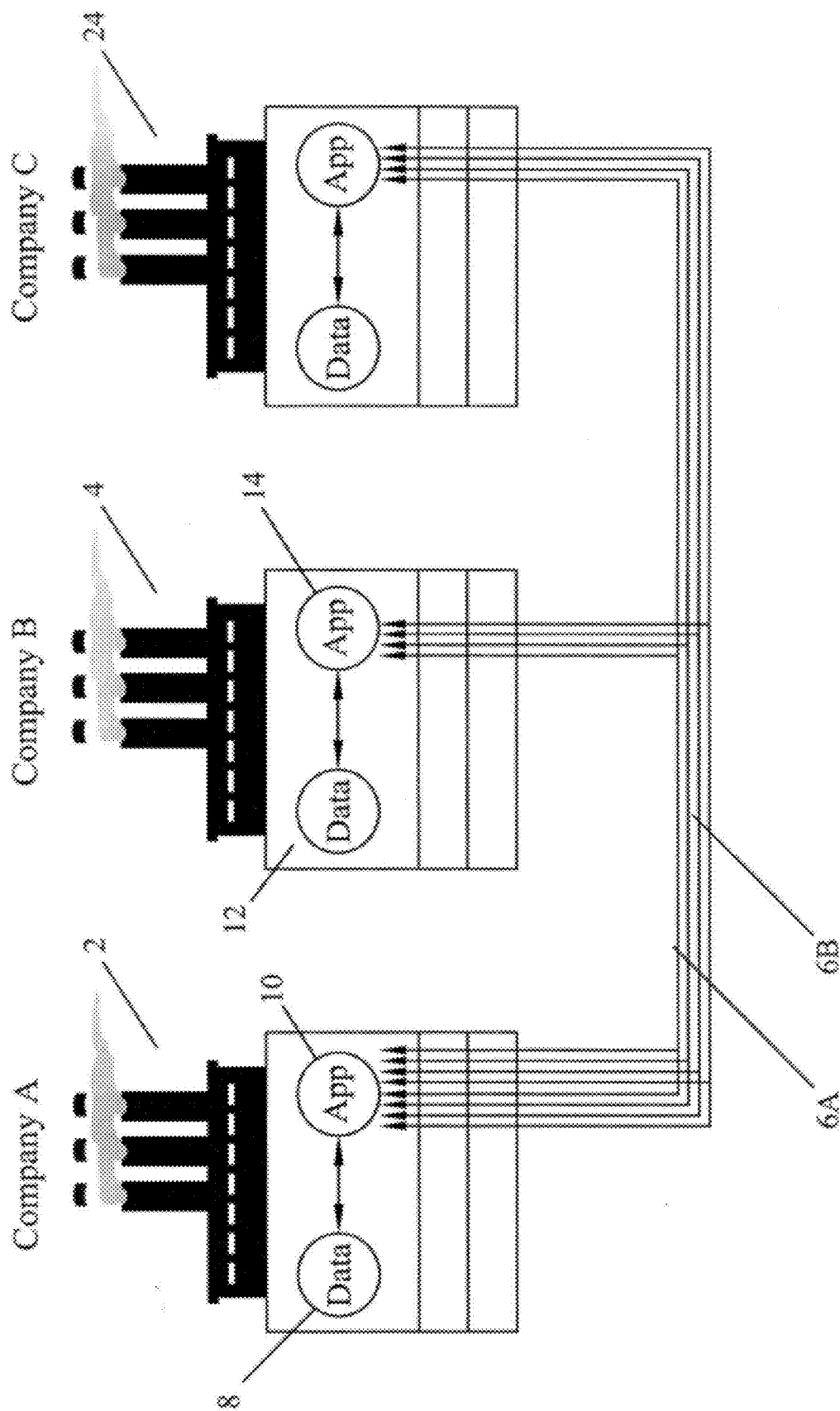
FIG. 1B is a schematic diagram of a conventional embodiment of a system for providing information exchange between partner entities.

Referring now to FIGS. 1A and 1B, in an illustration of conventional connectivity methods and systems, Company A (2) agrees to share data with Company B (4) through a connection for a transaction 6. It can be appreciated that the transaction 6 involves an exchange of information such as the exchange of data 8 developed in one or more software applications 10 of Company A (2) with data 12 developed in one or more software applications 14 of Company B (4). In effecting the transaction 6 of information, Company A (2) and Company B (4) collaborate to develop compatible data formats and network configurations that promote effective transmission of data through the transaction 6.

In operation, Company A (2) implements custom integration software code 16 to format its data 8 for transmission through the transaction 6 to Company B (4). Company A (2) also configures its network firewalls 18 to allow an external connection and the transaction 6 with Company B (4). Company B (4) also implements integration software code 20 to receive and format data transmitted by Company A (2) through the transaction 6. It can be appreciated that at least one software application included in applications 10, 14 needs to be common between Company A (2) and Company B (4) to permit an exchange of information.

In an effort similar to Company A (2), Company B (4) configures its network firewalls 22 to create an external connection with Company A (2). This external connection permits the transaction 6 to exchange information between Company A (2) and Company B (4). Once the appropriate connections and integration software modifications are implemented, the data 12 of Company B (4) can also be transmitted through the transaction 6 to Company A (2).

As can be seen in FIG. 1B, a system of multiple point-to-point connections can be created with the addition of Company C (24), for example, as a partner in the strategic alliance between Company A (2) and Company B (4). As shown, the exchange of information becomes more complex as the number of partners 2, 4, 24 and connections for transactions (e.g., 6A and 6B) increases. Furthermore, it can be appreciated that it may be difficult to disconnect, connect, and/or reconnect partners in such an information sharing arrangement in an effective and convenient manner.

Figure 2:
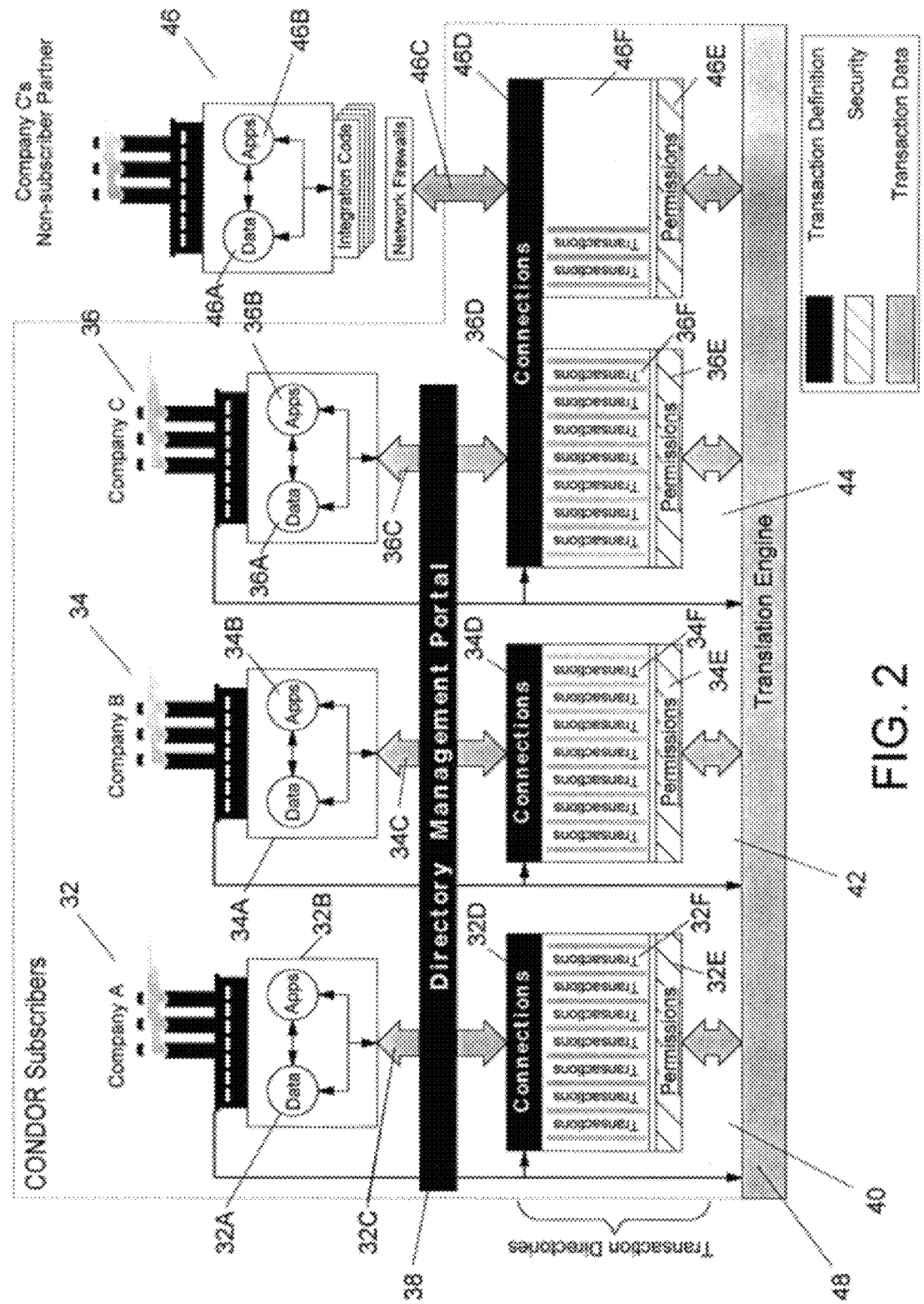
FIG. 2 is a schematic diagram of one embodiment of a system for facilitating information exchange between partner entities.
Figure 3:
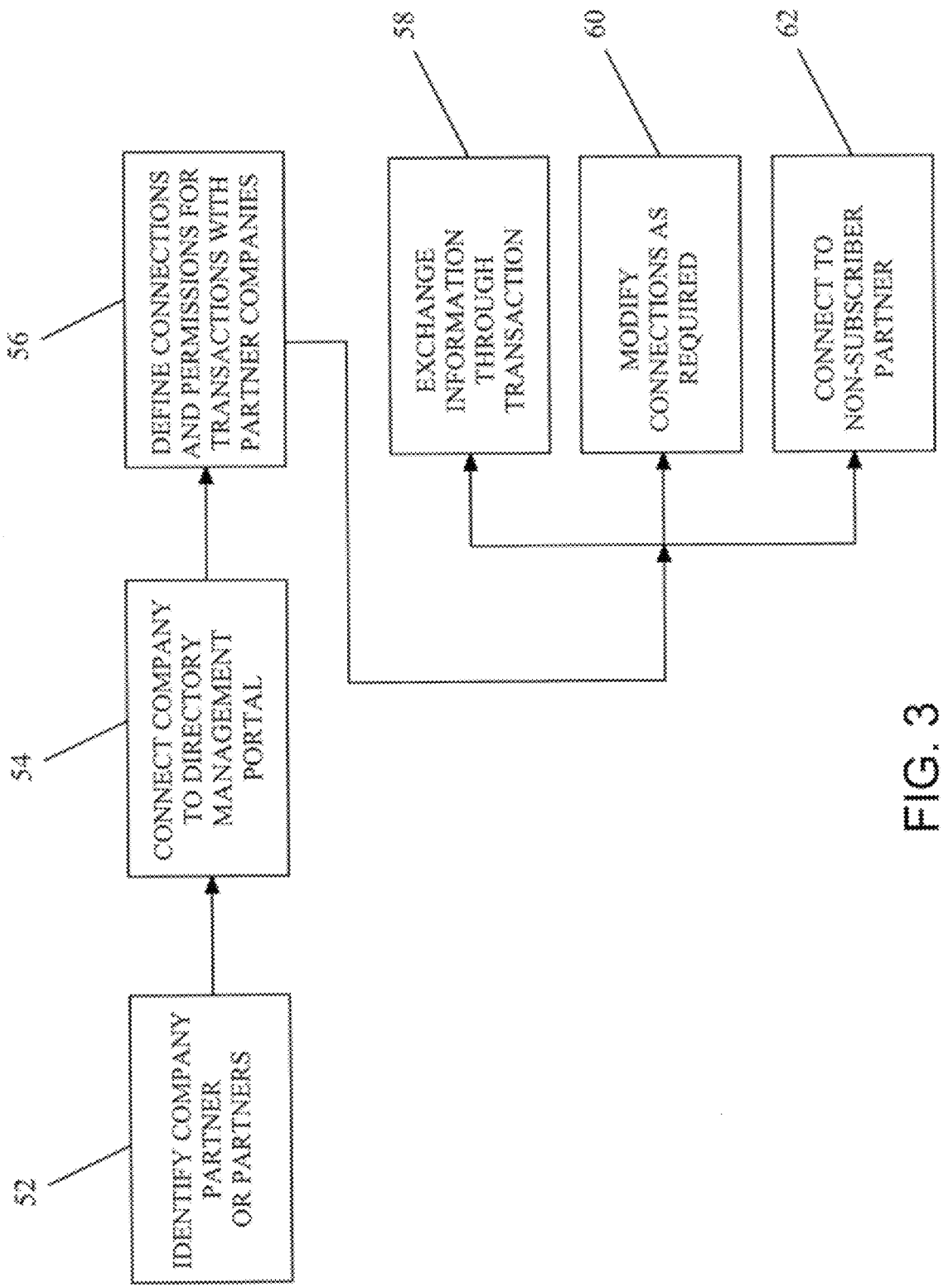
FIG. 3 is a process flow diagram of one embodiment of a method for facilitating information exchange between partner companies.

Referring now to FIGS. 2 and 3, one embodiment of the present methods and systems for creating connectivity and enabling information exchange between two or more companies is provided. Company A (32), Company B (34) and Company C (36) each have data 32A, 34A, 36A (respectively) and software applications 32B, 34B, 36B (respectively) associated with the function of their business activities. These companies 32, 34, 36 are identified for inclusion in step 52 in a partnership for information exchange between and among the companies 32, 34, 36. Each company 32, 34, 36 in the partnership maintains a connection 32C, 34C, 36C in step 54 to a directory management portal 38 that controls connections 32D, 34D, 36D and permissions 32E, 34E, 36E defined in step 56 that permit transactions 32F, 34F, 36F or exchanges of information to occur between two or more of the companies 32, 34, 36. Functionality for storing and modifying the connections 32D, 34D, 36D and the permissions 32E, 34E, 36E resides within one or more transaction directories 40, 42, 44 associated with each company 32, 34, 36 (respectively).

In operation, the directory management portal 38 can include, in one embodiment, a substantially secure web-based gateway to tools that control the content of the transaction directories 40, 42, 44. In another aspect, the content of the transaction directories 40, 42, 44 and the tools provided to a company 32, 34, 36 for establishing and modifying connections 32D, 34D, 36D can reside on the storage systems of an electronic business center (discussed in more detail hereinafter) that performs centralized management functions in effecting exchanges of information in step 58, for example, between and/or among the companies 32, 34, 36.

In one embodiment of the present methods and systems, the directory management portal 38 includes a management security LAN that permits the company 32, 34, 36 to see its connections 32D, 34D, 36D and use templates to modify those connections 32D, 34D, 36D in step 60. For example, the company 32, 34, 36 can readily make a change to its connection to one chemical exchange on the Internet to another chemical exchange without modifying existing software applications 32B, 34B, 36B or implementing new software applications. In another example, the company 32, 34, 36 can disconnect a supplier from its chain of manufacturing by modifying the existing connection to that supplier by accessing the directory management portal 38.

Through use of the transaction directories 40, 42, 44, the companies 32, 34, 36 can use standard transaction templates from a library containing multiple integration standards (e.g., BizTalk, MAPICS, EDI, and the like) to create transaction definitions for exchanging information with a partner company. A company 32, 34, 36 can also control partner access through the permissions layer 32E, 34E, 36E and view partner data connections 32D, 34D, 36D. In step 62, the company 36 can also create and manage a connection to transaction directories 46F for the data 46A and software applications 46B of a company partner 46 that does not have access to the directory management portal 38 for data exchanges (i.e., a "non-subscriber"). In one embodiment, a web portal can be employed that permits the company 36 to view what the non-subscriber partner 46 would have if it were a subscriber. The non-subscriber company 46 cannot modify the web portal interface 38 and the subscriber partner company 36 retains control of transactions 36F, 46F performed through the directory management portal 38. The subscriber partner company 36 can also view a list in its transaction directory 44 of existing subscriber partners and non-subscriber partners.

In one aspect, the transaction directories 40, 42, 44 can include an Internet site with conventional front-ended security and password capabilities and access to a conventional database of information related to data exchange with one or more of the partner companies. Such a database can include, for example, a list of connections 32D, 34D, 36D by company, a list of connections 32D, 34D, 36D by application, a list of connections 32D, 34D, 36D by data transmission standard, and the like. This database and other storage media can reside at a storage location associated with a centralized manager (described hereinafter) for the transaction directories 40, 42, 44. In another aspect, information related to connections 32D, 34D, 36D and transactions 32F, 34F, 36F between and among companies 32, 34, 36 can be listed in a conventional spreadsheet format, for example, for review by one of the companies 32, 34, 36.

A translation engine 48 permits information to be exchanged between two or more of the companies 32, 34, 36. In one embodiment of the present methods and systems, the translation engine 48 can include a centralized transaction manager that handles data transformation, transportation and routing between collaborating companies 32, 34, 36. The translation engine 48 can employ subscriber transaction definitions to effect this translation and transportation of data between and among the partner companies 32, 34, 36. Upon receiving a data request, an electronic commerce center (described hereinafter) and the translation engine 48 use the data descriptions residing in the transaction directories 40, 42, 44 to translate information as it is transmitted and received between and among the companies 32, 34, 36.

It can be appreciated that the present methods and systems permit companies to create peer-to-peer relationships with other partner companies without substantial modification of internal data and applications. Using a secure web portal, companies can manage information about the location and format of their shared data and applications. Due to centralized management of transaction directories, a company's information systems and data remain in an environment internal to the company. It can be seen that the translation and collaboration features of the present methods and systems can reduce or substantially eliminate dependency by a company on core systems when building new applications and working with new partners in a strategic alliance, for example.

For companies that must share information electronically, the present methods and systems provide ease of management, company partner connections are managed and monitored through a single gateway; provide security, a company can route external connections through a single point of firewall penetration; reduce the cost of partner integration, a company's connections may be reused for multiple partners; increase flexibility, a company can easily change or multiply partners as required; provide minimal disruption, a company's information systems typically do not have to conform to any particular standard for data format or data communication to be applied to the present methods and systems.

Figure 4:
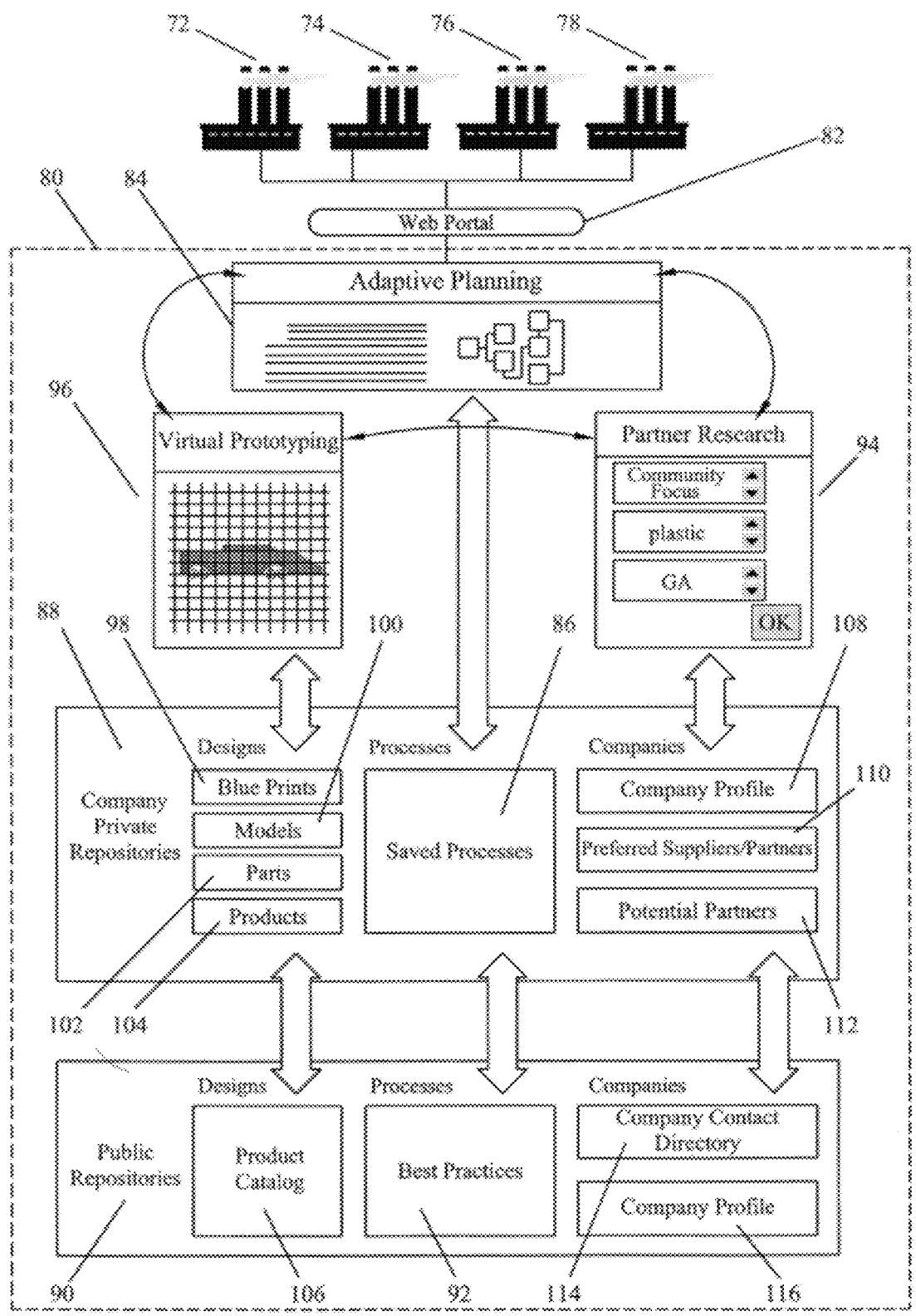
FIG. 4 is a schematic diagram of one embodiment of a system for facilitating information exchange between partner companies in association with product design and development.

Referring now to FIG. 4, in another embodiment of the present methods and systems, the above-described centralized management features associated with information exchange between partners can be employed for product design and development. As shown, a number of companies 72, 74, 76, 78 access a product design and development application 80 through a web portal 82 that provides a single collaborative point of access and control to features of the application 80 for each company 72, 74, 76, 78. The web portal 82 allows a project team administrator, for example, to perform certain tasks including, for example, establishing security and permission levels for team members, controlling access and delivering customized views based on permission level of team members, and monitoring and reporting on team member activity. In one embodiment, the web portal 82 can include a secure web portal that is hosted by an electronic business center at a centralized location.

In one embodiment, an adaptive planning module 84 allows subscribers to create, optimize and save workflow processes and production implementation plans in a saved processes storage medium 86. The adaptive planning module 84 can permit queries of both private repositories 88 and public repositories 90 to access existing processes in storage 86 and "best practices" information 92 that may be available in one or more of the public repositories 90. The adaptive planning module 84 can also include software modules that link components of product/service design to production/implementation steps to forecast cost and time to produce/implement the product. The adaptive planning module 84 can also have an associated partner research module 94 that executes "what if" scenarios with different components/raw material and/or different partners to assess impact on the design, production/implementation process, cost and timing. The adaptive planning module 84 can also have an associated virtual prototyping module 96 that interacts with the private repositories 88 and public repositories 90 to obtain design information, for example.

In another embodiment of the present methods and systems, the virtual prototyping module 96 allows the companies 72, 74, 76, 78 to substantially concurrently build, test and refine a design virtually using collaborative software and "best-in-class" prototyping tools. The virtual prototyping module 96 can provide access to internal company designs such as, for example, blueprints 98, models 100, parts 102, and products 104 that are specific and possibly proprietary to one of the companies 72, 74, 76, 78. The virtual prototyping module 96 can also provide access and queries of one or more product catalogs 106, for example, in the public repositories 90 to help assess options for outsourcing components of a product, for example.

In another embodiment, the partner research module 94 can access the two types of repositories 88, 90. The private repositories 88 of the subscriber companies 72, 74, 76, 78 can include, for example, company profile information 108, preferred supplier and partner profile information 110, and potential partner information 112. The public repositories 90 to which the companies 72, 74, 76, 78 have access can include a company contact directory 114 and a public profile 116 for existing or potential company partners. The partner research module 94 allows subscribers to maintain their company and partner profile information which can include, for example, type of business (e.g., raw material, assembly/packaging, manufacturing, transportation and distribution, warehouse/inventory, and the like); and business practices (e.g., core values, staffing, partnering, business initiative, financials, customer satisfaction, and the like). The partner research module 94 also provides search capabilities for identifying potential partner companies by selecting and prioritizing elements from the company information obtained from the repositories 88, 90. The module 94 also allows interactive analysis to refine partner search results obtained from profile queries.

Figure 5:
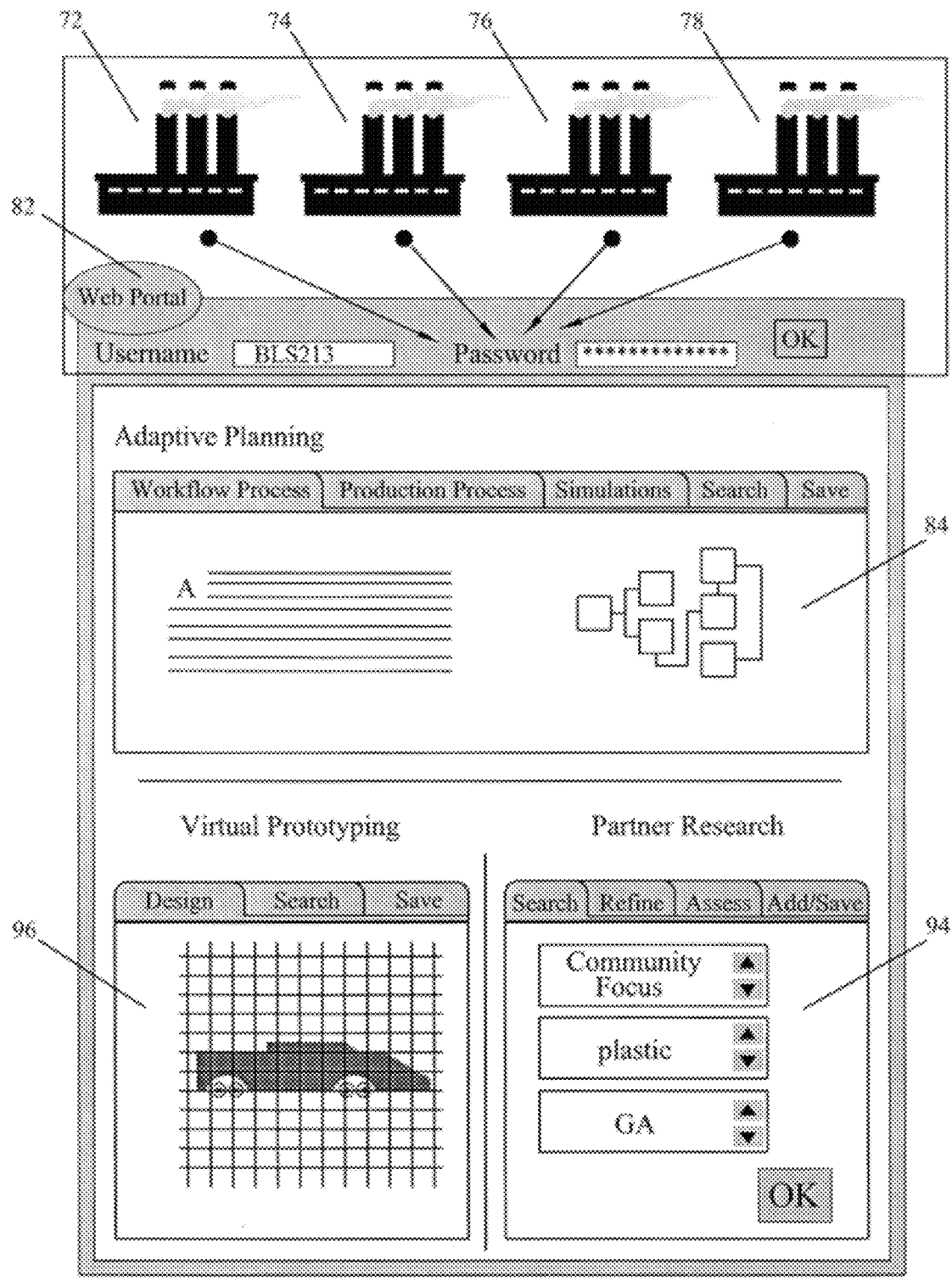
FIG. 5 is an illustration showing sample details of various aspects of certain elements of FIG. 4.

In connection with the illustration of FIG. 5, the following is an example of the operation of the present methods and systems in connection with product design and development:

I. Design & Planning Phase
  A. The project development team has an idea.
  B. The team logs in and initializes the workflow process using the adaptive planning module 84.
  C. The team creates a design for the idea in the virtual prototyping module 96.
  D. Concurrently, the team updates the workflow process in the adaptive planning module 84. To help minimize upfront planning time, the team executes queries in their private repository for saved processes matching current project needs.
  E. The team continues to refine the design and utilizes the query function in the virtual prototyping module 96 to scan private and public product catalogs for models, parts and products to help assess in-sourcing/outsourcing needs and possibilities.
  F. Based on the identified needs, the team utilizes the partner research module 94 to scan a library of preferred supplier/partners for a possible match. The team can extend the search by pre-defining a company profile and then executing the query in the public company profile repository. Results of that query can be stored in the library of potential suppliers/partners.

II. Simulating the Production Process
  A. The team runs "what if" scenarios in the adaptive planning module 84 with different components/raw materials and/or different partners/suppliers to assess impact on design, production process, cost and time.
  B. Based on these scenarios, the production process is optimized, and the supply network is assembled including identification of appropriate suppliers.

The benefits of the present methods and systems as applied to product design and development are readily apparent. In certain embodiments, the present methods and systems provide an Internet-hosted environment that offers a single point of access and control. This allows subscribing companies to increase the speed of bringing new products and services to market, reduce research and development investment, simulate and integrate collaborative design/prototyping, product planning, and partnering activities.

The following operational examples provide potential embodiments of the methods and systems described herein. Such examples are provided for illustration of the present disclosure and are not intended to limit any particular aspect of the present invention.

The table of FIG. 6 provides a list of industry terms equivalent or related to those applied to the present methods and systems with regard to "CONDOR" and "HALO" technology. It can be appreciated that choice of a particular nomenclature for the present methods and systems is merely for convenience of disclosure and is not intended to limit any particular aspect of the present invention.

Figure 7:
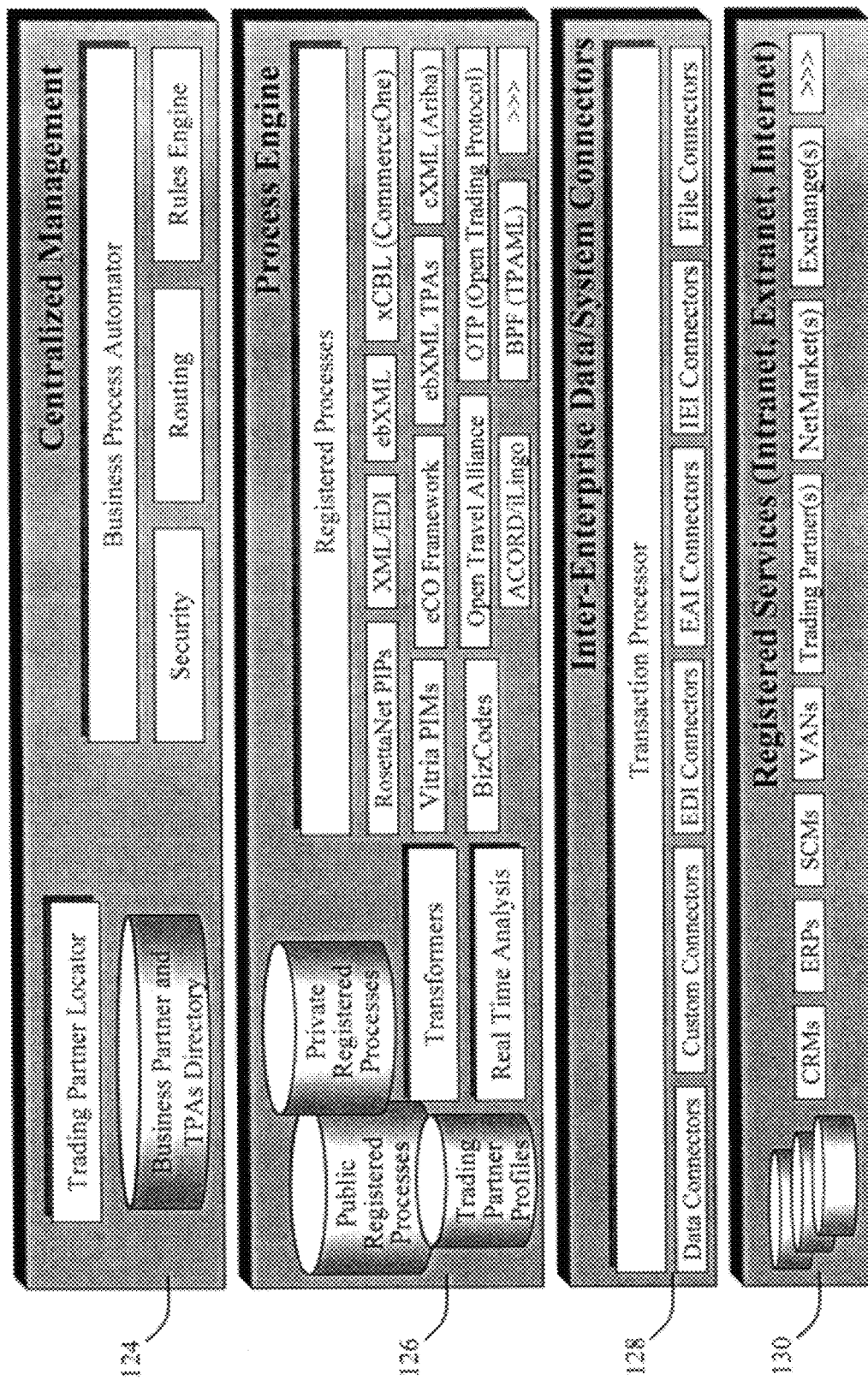
FIG. 7 is a schematic diagram illustrating one embodiment of a centralized manager and its associated functionality that can be employed to perform information exchange.

The schematic of FIG. 7 shows the various components of a centralized manager 122 and its associated functionality that can be employed to implement various embodiments of the present methods and systems. The centralized manager 122 includes centralized management 124 and a process engine 126 for accessing information and effecting transactions. Also shown are examples of inter-enterprise data/system connectors 128 and examples of registered services 130 for use by partner companies.

Figure 8:
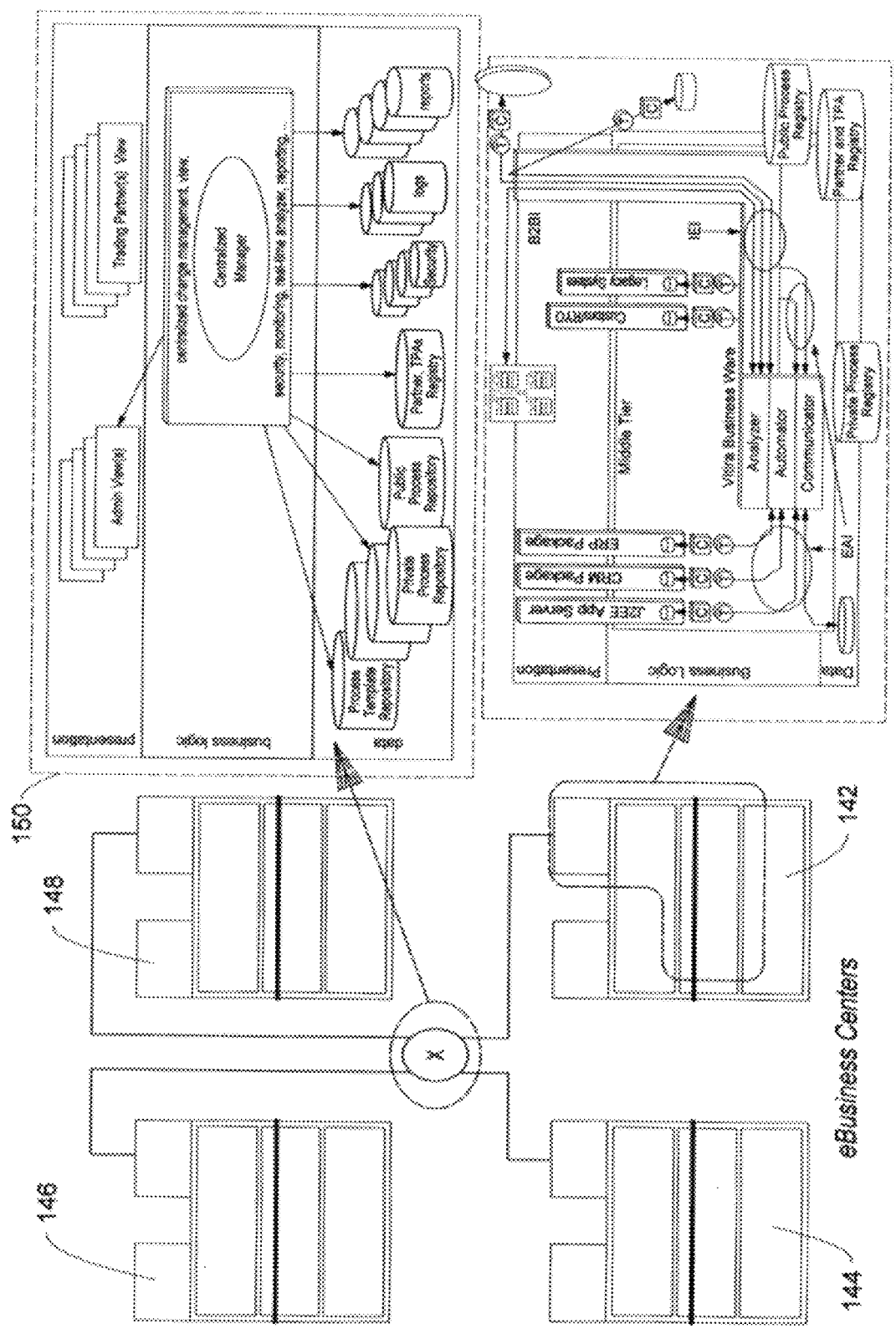
FIG. 8 is a schematic diagram illustrating one embodiment of the interaction of a centralized manager and multiple electronic business centers.

FIG. 8 shows the interaction between one or more business centers 142, 144, 146, 148 and a centralized manager 150. FIG. 8 provides an example of the interaction of the centralized manager 150 with a number of the electronic business centers 142, 144, 146, 148 that store and process the data and functionality that enables the exchange of information between partner companies (as discussed hereinabove).

FIGS. 9 through 15 illustrate potential tool sets (and issues associated with the use of the tool sets) for implementing various embodiments of the present methods and systems. FIG. 9 includes a tabulation of potential tool sets that can be used in connection with the directory management portal. FIG. 10 includes a tabulation of potential tool sets that can be used in connection with the transaction directories. FIG. 11 includes a tabulation of potential tool sets that can be used in connection with the translation engine. FIG. 12 includes a tabulation of potential tool sets that can be used in connection with the adaptive planning module. FIG. 13 includes a tabulation of potential tool sets that can be used in association with the virtual prototyping module. FIG. 14 includes a tabulation of potential tool sets that can be used in connection with the partner research module. FIG. 15 shows a tabulation of potential combinations of tool sets that can be assembled and implemented to provide one or more operational embodiments of the present methods and systems.

The term "computer-readable-medium" is defined herein as understood by those skilled in the art. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be a wireless or wireline variety of a microcomputer, minicomputer, laptop, personal data assistant (PDA), cellular phone, pager, processor, or any other computerized device capable of transmitting and receiving data over a shared network. Computer devices disclosed herein can include memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (extended erasable PROM), and other like computer-readable media.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention.

Whereas particular embodiments of the invention have been described herein for the purpose of illustrating the invention and not for the purpose of limiting the same, it can be appreciated by those of ordinary skill in the art that numerous variation of the details; materials and arrangement of parts may be made within the principle and scope of the invention without departing from the invention as described in the appended claims.

What is claimed is:

1. A method for exchanging information between collaborative entities, the method comprising:
   operatively associating, by a directory management portal, a first entity with a transaction directory through the directory management portal, the transaction directory being configured to permit establishment of a first connection between the first entity and a translation engine for permitting a transaction to occur through the first connection;
   connecting, by the directory management portal, a second entity to the translation engine to permit the transaction to occur between the first entity and the second entity, the transaction including an exchange of information associated with a product design between the first entity and the second entity, wherein the directory management portal permits the first entity to monitor and change the first connection to the translation engine using a transaction template selected from a library to create a transaction definition for exchanging information with the second entity;
   accessing information associated with the first and second entities and effecting transactions, by the translation engine, via the first connection through the translation engine;
   permitting, by the directory management portal, the first entity to create a second connection to data associated with a non-subscribing entity, wherein the non-subscribing entity does not have access to the directory management portal;
   receiving, at the directory management portal, a query for an existing process related to the product design;
   in response to the query, searching, by the directory management portal, private repositories associated with the first entity and the second entity and public repositories accessible by the first entity and the second entity for the existing process;
   executing, by the directory management portal, a variety of scenarios with different components and suppliers to determine an impact on the product design; and
   associating, by the directory management portal, components of the product design with production steps to forecast a cost for producing the product design.

2. The method of claim 1, further comprising operating the translation engine externally with regard to a software application of the first and second entities.

3. The method of claim 1, further comprising establishing a permission for an occurrence of the transaction between the first and second entities.

4. The method of claim 1, further comprising searching the private repositories associated with the first entity and the second entity for models, parts, and products to access outsourcing needs for the product design.

5. The method of claim 1, wherein the directory management portal includes a web-based gateway.

6. The method of claim 1, further comprising connecting the first and second entities to an additional partner entity by accessing the transaction directory through the directory management portal.

7. The method of claim 1, further comprising disconnecting a partner entity from the first and second entities by accessing the transaction directory through the directory management portal.

8. A method for exchanging information between collaborative entities, the method comprising:
   operatively associating, by a directory management portal, a first entity with a transaction directory through the directory management portal, the transaction directory being configured to permit establishment of a first connection between the first entity and a translation engine for permitting a transaction to occur through the first connection;
   connecting, by the directory management portal, a second entity to the translation engine to permit the transaction to occur between the first entity and the second entity, the transaction including an exchange of information associated with a product design between the first entity and the second entity, wherein the directory management portal permits the first entity to monitor and change the first connection to the translation engine using a transaction template selected from a library to create a transaction definition for exchanging information with the second entity;

accessing information associated with the first and second entities and effecting transactions, by the translation engine, via the first connection through the translation engine;

permitting, by the directory management portal, the first entity to create a second connection to data associated with a non-subscribing entity, wherein the non-subscribing entity does not have access to the directory management portal;

receiving, at the directory management portal, a query for an existing process related to the product design;

in response to the query, searching, by the directory management portal, private repositories associated with the first entity and the second entity and public repositories accessible by the first entity and the second entity for the existing process;

executing, by the directory management portal, a variety of scenarios with different components and suppliers to determine an impact on the product design; and associating, by the directory management portal, components of the product design with production steps to forecast an amount of time to produce the product design.

9. The method of claim 8, further comprising operating the translation engine externally with regard to a software application of the first and second entities.

10. The method of claim 8, further comprising establishing a permission for an occurrence of the transaction between the first and second entities.

11. The method of claim 8, wherein the directory management portal includes a web-based gateway.

12. The method of claim 8, further comprising connecting the first and second entities to an additional partner entity by accessing the transaction directory through the directory management portal.

13. The method of claim 8, further comprising disconnecting a partner entity from the first and second entities by accessing the transaction directory through the directory management portal.

14. The method of claim 8, further comprising searching the private repositories associated with the first entity and the second entity for models, parts, and products to access outsourcing needs for the product design.

15. A non-transitory computer-readable storage medium having instructions stored thereon that, when executed by a computer, cause the computer to perform a method comprising:

operatively associating a first entity with a transaction directory through a directory management portal, the transaction directory being configured to permit establishment of a first connection between the first entity and a translation engine for permitting a transaction to occur through the first connection;

connecting a second entity to the translation engine to permit the transaction to occur between the first entity and the second entity, the transaction including an exchange of information associated with a product design between the first entity and the second entity, wherein the directory management portal permits the first entity to monitor and change the first connection to the translation engine using a transaction template selected from a library to create a transaction definition for exchanging information with the second entity;

accessing information associated with the first and second entities and effecting transactions via the first connection through the translation engine;

permitting the first entity to create a second connection to data associated with a non-subscribing entity, wherein the non-subscribing entity does not have access to the directory management portal;

receiving a query for an existing process related to the product design;

in response to the query, searching private repositories associated with the first entity and the second entity and public repositories accessible by the first entity and the second entity for the existing process;

executing a variety of scenarios with different components and suppliers to determine an impact on the product design; and associating components of the product design with production steps to forecast a cost for producing the product design.

16. The non-transitory computer-readable storage medium of claim 15, having further instructions stored thereon that, when executed by the computer, cause the computer to perform a method comprising operating the translation engine externally with regard to a software application of the first and second entities.

17. The non-transitory computer-readable storage medium of claim 15, having further instructions stored thereon that, when executed by the computer, cause the computer to perform a method comprising establishing a permission for an occurrence of the transaction between the first and second entities.

18. The non-transitory computer-readable storage medium of claim 15, having further instructions stored thereon that, when executed by the computer, causes the computer to perform a method comprising connecting the first entity and the second entity to an additional partner entity by accessing the transaction directory through the directory management portal.

19. The non-transitory computer-readable storage medium of claim 15, having further instructions stored thereon that, when executed by the computer, causes the computer to perform a method comprising disconnecting the first entity and the second entity from a partner entity by accessing the transaction directory through the directory management portal.

20. The non-transitory computer-readable storage medium of claim 15, having further instructions stored thereon that, when executed by the computer, causes the computer to perform a method comprising associating the components of the product design with the production steps to forecast an amount of time for producing the product design.

* * * * *